United States Patent
Mathieu

(10) Patent No.: US 8,602,248 B2
(45) Date of Patent: Dec. 10, 2013

(54) COOKING UTENSIL

(75) Inventor: Randall Mathieu, Hudson, MA (US)

(73) Assignee: Bose Corporation, Framingham, MA (US)

( * ) Notice: Subject to any disclaimer, the term of this patent is extended or adjusted under 35 U.S.C. 154(b) by 253 days.

(21) Appl. No.: 13/038,489

(22) Filed: Mar. 2, 2011

(65) Prior Publication Data
US 2012/0223086 A1 Sep. 6, 2012

(51) Int. Cl.
*A47J 27/00* (2006.01)
(52) U.S. Cl.
USPC .............. 220/573.1; 220/573.3; 220/627; 220/626; 220/912; 219/622; 219/621; 219/620
(58) Field of Classification Search
USPC .............. 220/573.1, 573.3, 592.05, 626–627, 220/912; 219/620–622; 99/DIG. 14; 126/309.1
See application file for complete search history.

(56) References Cited

U.S. PATENT DOCUMENTS

| | | |
|---|---|---|
| 2,321,587 A | 6/1943 | Davie et al. |
| 2,782,782 A * | 2/1957 | Taylor ........................ 126/374.1 |
| 3,530,499 A | 9/1970 | Schroeder |
| 3,740,513 A | 6/1973 | Peters, Jr. et al. |
| 3,742,174 A | 6/1973 | Harnden, Jr. |
| 3,742,178 A | 6/1973 | Harnden, Jr. |
| 3,745,290 A | 7/1973 | Harnden, Jr. et al. |
| 3,777,094 A | 12/1973 | Peters, Jr. |
| 3,782,222 A | 1/1974 | Berggren |
| 3,782,976 A * | 1/1974 | Maier et al. ................. 220/573.1 |
| 3,966,426 A | 6/1976 | McCoy et al. |
| 3,979,572 A | 9/1976 | Ito et al. |
| 4,013,859 A | 3/1977 | Peters, Jr. |
| 4,020,310 A | 4/1977 | Souder, Jr. et al. |
| 4,258,695 A * | 3/1981 | McCarton et al. ......... 126/375.1 |
| 4,354,082 A | 10/1982 | Tellert et al. |
| 4,404,459 A | 9/1983 | Harton |
| 4,541,411 A | 9/1985 | Woolf |
| 4,564,001 A | 1/1986 | Maeda et al. |
| 4,576,080 A | 3/1986 | McLellan et al. |
| 4,579,080 A | 4/1986 | Martin et al. |

(Continued)

FOREIGN PATENT DOCUMENTS

| | | |
|---|---|---|
| CN | 1666342 A | 9/2005 |
| DE | 299 07 003 U1 | 7/1999 |

(Continued)

OTHER PUBLICATIONS

JP Office Action dated Apr. 3, 2012 for JP Appln. No. 2010-524166.

(Continued)

*Primary Examiner* — Mickey Yu
*Assistant Examiner* — Brijesh V. Patel
(74) *Attorney, Agent, or Firm* — Brian M. Dingman; Dingman IP Law, PC

(57) ABSTRACT

A cooking utensil for use with an induction cooktop having a cooktop surface and an induction heating coil. The cooking utensil has an inner wall made from an electrically conductive material, an outer wall made from an electrically non-conductive material, and a gap between the inner and outer walls. There is an intermediate wall in the gap. The intermediate wall divides the gap into an inner chamber between the inner wall and the intermediate wall and an outer chamber between the outer wall and the intermediate wall.

29 Claims, 7 Drawing Sheets

(56) References Cited

U.S. PATENT DOCUMENTS

| | | | |
|---|---|---|---|
| 4,596,236 A | | 6/1986 | Eide et al. |
| 4,646,935 A | | 3/1987 | Ulam |
| 4,790,292 A | | 12/1988 | Kuhn et al. |
| 5,532,460 A | | 7/1996 | Okato et al. |
| 5,579,946 A | * | 12/1996 | Rowan et al. ............... 220/627 |
| 5,643,485 A | | 7/1997 | Potter et al. |
| 5,727,448 A | * | 3/1998 | Sa ................................. 99/331 |
| 5,786,102 A | * | 7/1998 | Paz-Pujalt et al. ............ 428/689 |
| 6,005,233 A | * | 12/1999 | Wyatt .............................. 219/621 |
| 6,054,697 A | | 4/2000 | Woodward et al. |
| 6,059,953 A | | 5/2000 | Hatta et al. |
| 6,179,155 B1 | * | 1/2001 | Komiya et al. ........... 220/592.11 |
| 6,179,203 B1 | * | 1/2001 | Toussant et al. .......... 229/122.34 |
| 6,232,585 B1 | | 5/2001 | Clothier et al. |
| 6,274,856 B1 | | 8/2001 | Clothier et al. |
| 6,467,645 B2 | * | 10/2002 | Park .............................. 220/573.1 |
| 6,474,499 B2 | | 11/2002 | Donelson et al. |
| 6,576,876 B2 | | 6/2003 | Cartossi |
| 6,953,919 B2 | | 10/2005 | Clothier |
| 6,967,311 B1 | * | 11/2005 | Tseng et al. ................. 220/573.1 |
| 7,026,587 B2 | | 4/2006 | Yang et al. |
| 7,081,603 B2 | | 7/2006 | Hoh et al. |
| 7,554,060 B2 | | 6/2009 | England et al. |
| 7,980,171 B2 | * | 7/2011 | Groll .............................. 99/340 |
| 2001/0042753 A1 | * | 11/2001 | Park .............................. 220/573.1 |
| 2003/0116560 A1 | * | 6/2003 | Wyatt .............................. 219/621 |
| 2004/0229079 A1 | | 11/2004 | Groll |
| 2005/0084633 A1 | | 4/2005 | Baba et al. |
| 2005/0115958 A1 | | 6/2005 | Hoh et al. |
| 2006/0032266 A1 | | 2/2006 | Gagnon |
| 2006/0289487 A1 | | 12/2006 | Tarenga |
| 2009/0065496 A1 | | 3/2009 | England et al. |
| 2009/0065497 A1 | | 3/2009 | England |
| 2009/0065498 A1 | | 3/2009 | England |
| 2009/0065499 A1 | | 3/2009 | England |
| 2009/0065500 A1 | | 3/2009 | England et al. |
| 2009/0230116 A1 | * | 9/2009 | Hsu .............................. 220/573.1 |
| 2010/0147832 A1 | | 6/2010 | Barker, III et al. |
| 2010/0294753 A1 | * | 11/2010 | Jones et al. ................... 219/621 |

FOREIGN PATENT DOCUMENTS

| | | |
|---|---|---|
| DE | 10019968 | 10/2000 |
| DE | 20 2005 010 652 | 10/2005 |
| EP | 162645 | 11/1985 |
| EP | 0928587 | 7/1999 |
| EP | 1054609 | 11/2000 |
| GB | 1522383 | 8/1978 |
| JP | 51-60037 | 5/1976 |
| JP | 60-164334 A | 10/1985 |
| JP | 1144591 | 6/1989 |
| JP | 08096946 | 4/1996 |
| JP | 9-276155 A | 10/1997 |
| JP | 2001-108187 A | 4/2001 |
| JP | 2001299575 A | 10/2001 |
| JP | 2003-275097 A | 9/2003 |
| JP | 2003275097 | 9/2003 |
| JP | 2003-339549 A | 12/2003 |
| JP | 2004305547 A | 11/2004 |
| JP | 2006120336 A | 5/2006 |
| JP | 2007 296262 A | 11/2007 |
| WO | 9831197 | 7/1998 |
| WO | 9940825 A1 | 8/1999 |

OTHER PUBLICATIONS

JP Office Action dated Apr. 3, 2012 for JP Appln. No. 2010-524189.
Aerogel; Wikipedia; http://en.wikipedia.org/wiki/Aerogel; last accessed Dec. 8, 2010.
International Search Report and Written Opinion of the International Searching Authority issued in corresponding PCT Application No. PCT/US2012/027063.
CN Second Office Action dated Apr. 17, 2012 for CN Appln. No. 200880105906.2.
Chinese Office Action dated Jun. 13, 2012 for Application No. 200880105906.2.
"Heat Concepts for BASF", www.ideo.com, http://www.ideo.com/portfolio/print.asp?x=19004905(2006), downloaded Feb. 8, 2008.
"Thermos Vacuum Insulated Cook and Carry System", www.thermalcookware.com, http://www.thermalcookware.com/page.php?m_id=Mg==&s_id=NQ==,downloaded Aug. 10, 2007.
International Search Report and Written Opinion dated Jan. 26, 2009, issued in International Application No. PCT/US2008/075339, filed Sep. 5, 2008.
International Search Report and Written Opinion dated Jan. 26, 2009, issued in International Application No. PCT/US2008/075422, filed Sep. 5, 2008.
International Preliminary Report on Patentability dated Nov. 11, 2009 for PCT/US2008/075422.
International Preliminary Report on Patentability, dated Mar. 18, 2010 for PCT/US2008/075339 filed Sep. 5, 2008.
EP Extended Search Report dated Jul. 28, 2010 for EP 10159184.0-1258 / 2210541.
CN Office Action dated Apr. 26, 2011 for CN Appln. No. 200880105906.2.
CN Office Action dated Jul. 7, 2011 for Chinese Patent Application No. 200880105908.1.
EP Office Action dated Sep. 28, 2011 for EP Application No. 08 829 036.6-1258.
EP Notice of Allowance dated Oct. 27, 2011 for EP Application No. 08 829 036.6.
CN Office Action dated Dec. 7, 2011 for CN Appl. No. 200880105908.1.

* cited by examiner

COOKING UTENSIL

FIELD

This disclosure relates to a cooking utensil.

BACKGROUND

In induction cooking, an alternating current in an induction coil produces a time-varying magnetic field that induces current flow in a conductive (typically ferromagnetic) target that is a part of the cookware. The induced current flow causes the target to heat. The heat is transferred to the cooking surface for heating or cooking food or other items located on the cooking surface of the cookware. Heat from the target is also transferred to the outer surface of the cookware, which creates a safety issue and can make the cookware too hot to handle or place on a tabletop or other heat-sensitive surface. Heating of the outer surface of the cookware also causes the cooktop to be heated, which can present its own safety issues.

SUMMARY

In general, one aspect of the disclosure features a cooking utensil for use with an induction cooktop having a cooktop surface and an induction heating coil, the cooking utensil comprising an inner wall comprising an electrically conductive material, an outer wall comprising an electrically non-conductive material, a gap between the inner and outer walls, and an intermediate wall in the gap, the intermediate wall dividing the gap into an inner chamber between the inner wall and the intermediate wall and an outer chamber between the outer wall and the intermediate wall.

Various implementations of the disclosure may include one or more of the following features. The cooking utensil may further comprise a layer of thermally insulating material positioned between the inner wall and the outer wall. The outer wall may define a bottom portion and the layer of thermally insulating material may have an area that substantially covers at least the bottom portion of the outer wall. The intermediate wall may comprise a generally annular member that is in contact with the layer of thermally insulating material and one or both of the inner wall and the outer wall. The inner and outer walls may be spaced from one another except at a joint location where they are coupled together, and the intermediate wall may contact the outer wall proximate the joint location. Alternatively the intermediate wall may not contact the inner wall. As an additional alternative, the intermediate wall may not contact the outer wall. The inner wall may define a bottom portion located closest to the cooktop surface during operation of the induction heating coil and a sidewall portion located farther from the cooktop surface during operation of the induction heating coil. The outer wall may define a bottom portion located on the cooktop surface during operation of the induction heating coil and a sidewall portion spaced above the cooktop surface during operation of the induction heating coil. The joint location may be proximate both the inner wall and the outer wall sidewall portions that are farthest from the cooktop surface when the bottom portion of the outer wall is located on the cooktop surface. The layer of thermally insulating material may define an outer edge closest to the sidewall portion of the outer wall, and the intermediate wall may be in contact with the layer of thermally insulating material proximate its outer edge.

Various additional implementations of the disclosure may include one or more of the following features. The intermediate wall may be a generally annular member that has two ends, a first end in contact with the layer of thermally insulating material and a second end in contact with the inner wall. The inner wall may comprise a bottom portion located closest to the cooktop surface during operation of the induction heating coil and a sidewall portion located farther from the cooktop surface during operation of the induction heating coil, and the second end of the intermediate wall may contact the sidewall portion of the inner wall, without contacting the outer wall. The layer of thermally insulating material may define an outer edge closest to the sidewall portion of the outer wall, and the first end of the intermediate wall may be in contact with the layer of thermally insulating material proximate its outer edge.

Various additional implementations of the disclosure may include one or more of the following features. The chambers may be closed or may be open at the bottom. The inner chamber may be an enclosed cavity and the outer chamber may be an enclosed cavity. The intermediate wall may comprise a tapered generally annular member. The intermediate wall may comprise a thin member, which may be a solid, generally annular member. The solid, generally annular member may be flared such that it is wider at one end than the other. The outer wall may comprise a bottom portion located on the cooktop surface during operation of the induction heating coil and a sidewall portion spaced above the cooktop surface during operation of the induction heating coil, the layer of thermally insulating material may define an outer edge closest to the sidewall portion of the outer wall, and the generally annular member may contact the layer of thermally insulating material proximate its outer edge. The generally annular member may be relatively rigid or may be flexible. The intermediate wall may be reflective of infrared radiation and/or have a low emissivity.

Various additional implementations of the disclosure may include one or more of the following features. The inner wall may comprise a ferromagnetic target that is adapted to be heated by induction, wherein the target is directly above and spaced from the layer of thermally insulating material. The outer wall may comprise a bottom portion located on the cooktop surface during operation of the induction heating coil and a sidewall portion spaced above the cooktop surface during operation of the induction heating coil. The layer of thermally insulating material may define an outer edge closest to the sidewall portion of the outer wall. The intermediate wall may comprise a thin, solid generally annular member that is in contact with the layer of thermally insulating material proximate its outer edge. The intermediate wall may also be in contact with one of the inner and outer walls.

Various additional implementations of the disclosure may include one or more of the following features. The intermediate wall may be comprised of thermally insulating material. The inner wall may comprise a ferromagnetic target that is adapted to be heated by induction and may further comprise a bottom portion located closest to the cooktop surface during operation of the induction heating coil and a sidewall portion located farther from the cooktop surface during operation of the induction heating coil, and the outer wall may comprise a bottom portion located on the cooktop surface during operation of the induction heating coil and a sidewall portion spaced above the cooktop surface during operation of the induction heating coil. The layer of thermally insulating material may be against the bottom portion of the outer wall and contact the sidewall portion of one or both of the inner wall and outer wall. Alternatively, the layer of thermally insulating material may be against the target and may contact the sidewall portion of one or both of the inner wall and outer wall.

In general, another aspect of the disclosure features a cooking utensil for use with an induction cooktop having a cooktop surface and an induction heating coil, the cooking utensil comprising an outer wall that is the outermost wall of the cooking utensil, the outer wall comprising an electrically non-conductive material, a bottom portion located on the cooktop surface during operation of the induction heating coil, and a sidewall portion spaced above the cooktop surface when the bottom portion of the outer wall is located on the cooktop surface. The cooking utensil further comprises a layer of thermally insulating material on the inside of the outer wall, wherein the layer of thermally insulating material has an area that substantially covers the bottom portion of the outer wall and defines an outer edge closest to the sidewall portion of the outer wall, and an inner wall comprising the innermost wall of the cooking utensil and a ferromagnetic target that is adapted to be heated by induction, wherein the target is directly above and spaced from the layer of thermally insulating material. The innermost wall defines a bottom portion located closest to the cooktop surface during operation of the induction heating coil and a sidewall portion located farther from the cooktop surface during operation of the induction heating coil. The innermost and outer walls are spaced from one another by a gap, except at a joint location where they are coupled together. The joint location is proximate both the innermost wall sidewall portion farthest from the cooktop surface when the bottom portion of the outer wall is located on the cooktop surface and the outer wall sidewall portion farthest from the cooktop surface when the bottom portion of the outer wall is located on the cooktop surface. There is a thin, solid generally annular partition positioned in the gap between the innermost wall and the outer wall. The partition is in contact with the layer of thermally insulating material proximate its outer edge and the partition is in contact with one or both of the outer wall and the inner wall proximate the joint location. The partition may contact both the outer wall and the inner wall, or the partition may not contact the inner wall.

In general, another aspect of the disclosure features a method for manufacturing a cooking utensil comprising providing an inner wall that includes at least some electrically conductive material that is configured to be a target for an induction heating coil, providing an outer wall formed of an electrically non-conductive material, providing a layer of insulation, providing a generally annular intermediate wall, locating the layer of insulation on the outer wall, locating the intermediate wall on the layer of insulation, and coupling the inner and outer walls such that the layer of insulation and the intermediate wall are located between the inner wall and outer wall, with the intermediate wall in contact with the layer of insulation and in contact with at least one of the inner wall and the outer wall. The intermediate wall may be constructed and arranged such that there is a first enclosed chamber between the inner wall and the intermediate wall and a second enclosed chamber between the outer wall and the intermediate wall. The intermediate wall may be constructed and arranged such that it has two ends, and the intermediate wall contacts the layer of insulation at or proximate a first end and contacts one of the inner wall and the outer wall at or proximate a second end. The intermediate wall may be further constructed and arranged such that no other part of the intermediate wall contacts either the inner wall or the outer wall.

DETAILED DESCRIPTION

Figure 1:
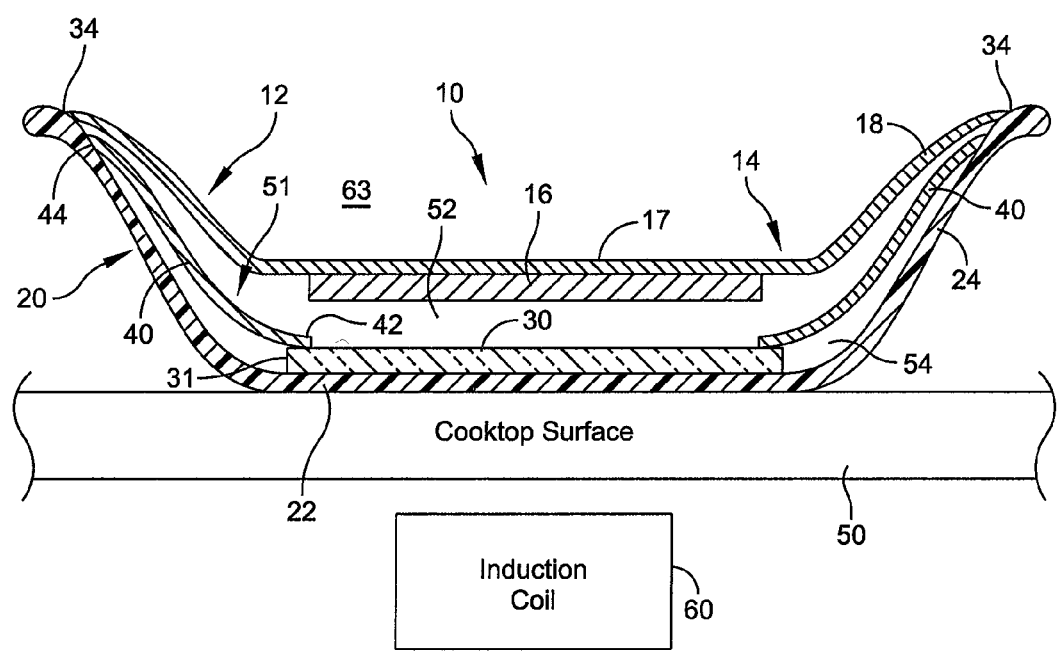
FIG. 1 is a cross-sectional view of a cooking utensil.

Cooking utensil 10 is depicted in FIG. 1. Utensil 10 is designed and constructed for use with an induction cooking system that has cooktop surface 50 on which utensil 10 is placed during the cooking operation. Heat is generated in utensil 10 via induction coil 60 that provides a time-varying magnetic field that heats cooking utensil 10. Induction cooking is well known.

Cooking utensil 10 comprises inner wall 12 that itself comprises innermost wall 14 and induction target 16. Induction target 16, and potentially innermost wall 14, is made from an electrically conductive material so that eddy currents are generated in target 16 by the magnetic field from coil 60, causing heating of target 16; 400 series stainless steel is a common target material. Because target 16 is directly coupled to innermost wall 14, the heat is conducted into wall 14 to heat food or other substances located in interior volume 63 of utensil 10. Innermost wall 14 has a bottom portion 17 that is the part of wall 14 that is closest to cooktop surface 50 during use of utensil 10. Innermost wall 14 also has a sidewall portion 18 that is located farther from cooktop surface 50 than portion 17 during operation of induction coil 60. This arrangement provides the cooking utensil interior volume 63 in which food or other substances are placed for heating or cooking.

Cooking utensil 10 further comprises outer wall 20 that is made fully or partially of an electrically non-conductive material that is not heated by the magnetic field. Outer wall 20 is typically made from glass or a plastic substance such as bulk molding compound, melamine or liquid crystal polymer. Other substances could be used that have the necessary properties (e.g., are not heated by induction, have appropriate strength, can be formed to the necessary shape, and can (as needed) be sealed to the inner wall). Outer wall 20 is positioned between inner wall 12 and induction heating coil 60 during operation of the induction heating coil. Outer wall 20 comprises bottom portion 22 and sidewall portion 24. Bottom portion 22 sits on cooktop surface 50 during use of utensil 10. Sidewall portion 24 is spaced above cooktop surface 50 during use of utensil 10. Inner wall 12 and outer wall 20 meet at location 34. Typically, walls 12 and 20 are joined together at location 34. Joinder of the walls, when present, can be accomplished in a desired manner. Non-limiting examples include a mechanical joint (e.g., by rolling the inner wall around the edge of the outer wall or by crimping the walls), a compression joint (e.g., using a snap ring), welding or an adhesive. Other aspects of cookware such as handle(s) and lid(s) are not shown but may be present.

Because inner wall 12 and outer wall 20 are spaced from each other except for where they meet (in this example at joint 34), gap 51 is formed between the walls. Note that a sealed joint between the inner and outer walls is not necessary in the cooking utensil. Target 16 is located in gap 51. Also located in gap 51 is a layer 30 of thermally insulating material. Layer 30 inhibits transfer of heat from target 16 into bottom portion 22 of outer wall 20. This helps to keep the outer wall cool and inhibits transfer of heat into cooktop surface 50. The cool outer wall allows the use of various materials for cooktop surface 50, including materials that cannot commonly be used for typical cooktops that become hot during use, for example via heat transfer from hot cookware. Cooktop surface 50 can be made from a traditional induction cooktop material such as a ceramic glass material, as is well known in the art. However, because the cookware is cool the cooktop may be made of other materials that are not as heat resistant, including materials that have not traditionally been used for cooktops such as solid surface countertop materials, wood, tile, laminate countertop materials, vinyl, glass other than ceramic glass, plastic, etc.

Insulation layer 30 can be made, for example, from an aerogel. The aerogel can be encapsulated by a plastic film or the like and held at vacuum or near vacuum. The plastic film can be coated so that the film acts as a reflector of infrared radiation. Non-limiting examples of infrared reflective coatings that can be used include a metalized layer where some of the material is removed to break up eddy current paths so that the material isn't heated by the induction field, and a non-magnetic substance that is not heated by induction, such as silicon oxide. Such reflective coated insulation creates an effective insulation layer that helps to keep bottom portion 22 at a relatively low temperature despite target 16 reaching temperatures of up to about 440° F. or greater. Insulation layer 30 can alternatively be made of other materials and can be constructed in other fashions. Layer 30 may cover some or substantially all of bottom portion 22, or may extend partially or completely along the length of sidewall portion 24. In this non-limiting example, layer 30 has an area that substantially covers only bottom portion 22. This places outer edge 31 of layer 30 proximate sidewall 24. With typical cookware that has a circular bottom, layer 30 is disc-shaped.

Cooking utensil 10 further comprises divider or intermediate wall 40 that is positioned in gap 51. Divider 40 is in contact with layer 30 and in contact with one or both of inner wall 12 and outer wall 20. In this non-limiting example, divider 40 is a thin, solid, flared, generally annular member that partitions gap 51 into inner chamber 52 and outer chamber 54. Inner chamber 52 is located between divider 40 and inner wall 12. Outer chamber 54 is located between outer wall 20 and divider 40. With a utensil in which the joint between the inner and outer walls is sealed, and using a solid wall as divider 40, the divider accomplishes a significant barrier and creates significant resistance to airflow: air can flow from chamber 52 into chamber 54 only through insulation layer 30, which may be porous but prevents bulk airflow. The result is that both of these chambers (52 and 54) are sealed. The chambers present in certain embodiments herein can be fully sealed to air infiltration, or can be at least sealed or closed sufficiently to inhibit flow of heated air from the inner to the outer chamber such that the outer wall of utensil 10 is cooler than it would be without the use of divider 40.

Divider 40 helps to prevent heat transfer from inner wall 12 (i.e., innermost wall 14 and target 16) to the portions of outer wall 20 that are not covered by insulation layer 30. Lower end 42 of divider 40 can be placed near outer edge 31 of layer 30. The other end 44 of divider 40 preferably contacts either inner wall 12 or outer wall 20. Preferably this contact is located as close as possible to joint 34 so that divider 40 shields most or all of sidewall portion 24 of outer wall 20 from heat emanating from inner wall 12. In this embodiment, divider or intermediate wall 40 contacts outer wall portion 24 proximate joint 34.

Target 16 and heated innermost wall 12 heat any air or other gas present in inner chamber 52. They also radiate heat into chamber 52. Divider 40 prevents heated gas and infrared radiation from reaching outer wall 20; particularly in this case substantially the entire length of sidewall portion 24 and any part of bottom portion 22 that is not covered by layer 30. Divider 40 will be heated by convection and radiation. Divider 40 will heat any gas in chamber 54, as well as radiate heat energy into chamber 54. Some of this heat will be transferred to wall 20. However, since gas heated by inner wall 12 cannot directly contact wall 2Q at any location except for any portion of wall 20 located above top end 44 of divider 40, divider 40 maintains outer wall 20 at a substantially lower temperature than it would be without divider 40. For example, in a simulation run using NX Thermal™ and NX Flow™ from MAYA Heat Transfer Technologies Ltd. of Montreal, Canada, adding divider 40 that comprised a 1 mm thick ring of plastic material with a thermal conductivity of about 0.3 W/mK dropped the temperature at the lower end of sidewall portion 24 from about 50° C. to about 36° C., and dropped the temperature at the part of sidewall 24 just below the upper end 44 of wall 40 from about 53° C. to about 47° C. A test of two pans, one with and one without the convection barrier, validated the insulating effect seen in this model. The pans were heated until the cooking surface was 165° C. The external wall of the pan with the barrier was approximately 9° C. cooler than the pan without the barrier.

Divider 40 is preferably a continuous solid member that is located, sized and shaped to shield as much as possible of outer wall 20 that is not covered by insulation from direct contact by gas heated by inner wall 12. A primary function of divider 40 is to prevent convective heat transfer from wall 12 to wall 20. This function could be achieved by almost any solid material that prevents or at least inhibits air movement and can withstand the heat to which it will be exposed. Non-limiting examples include films of plastic, rubber or ceramic, metal foils or composites of any material, such as fiberglass. Divider 40 could be a stiff ring made, for example, from a metal such as aluminum or steel, or could be a less substantial member such as a film, foil or tape. Another function of divider 40 is to inhibit radiative heat transfer to wall 20, which can be accomplished with a divider material that has low emissivity. For example, the emissivity may be less than about 0.5. Inhibition of radiative heat transfer can be enhanced if divider 40 comprises a reflective material on the surface that faces the inner wall that is effective to reflect infrared heat radiation. Also, the divider should have a relatively low thermal conductivity so as to further inhibit heat transfer to the outer wall. For use in inductive cooking systems, the divider should not be made of or include a material that is heated by an induction field.

In some cases it is desirable to push insulation layer or panel 30 against outer wall 20. This can be especially important if layer 30 is not inherently flat and thus needs to be pressed against wall 20 and/or if layer 3Q cannot itself be easily fixed to wall 20. Divider 40 can accomplish this function provided it is sufficiently mechanically robust and if there is sufficient downward pressure placed on it. Locating lower end 42 of divider 40 close to edge 31 of layer 30 can help to achieve this function.

Figure 2:
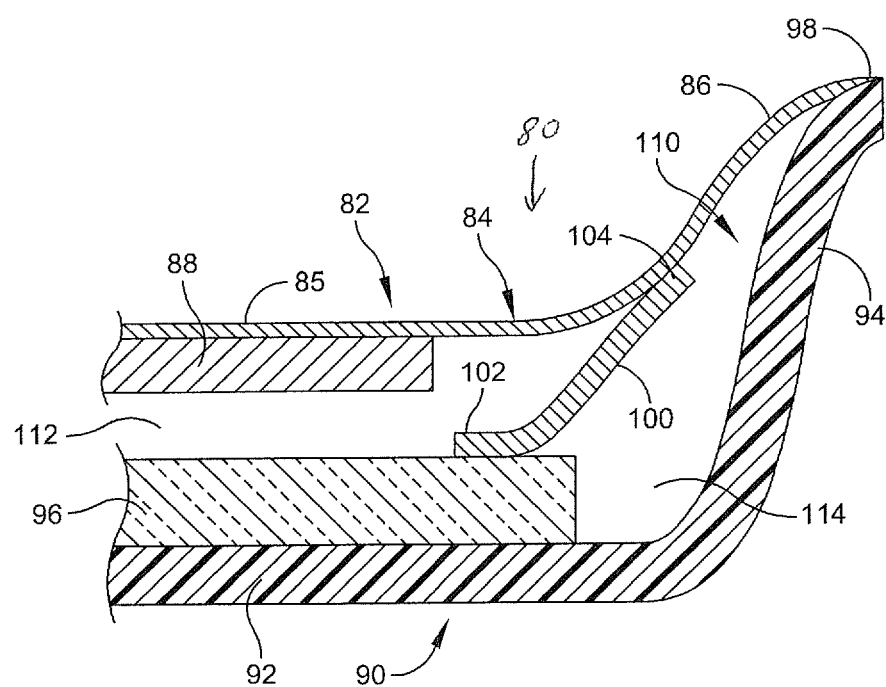
FIG. 2 is a partial, cross-sectional view of a cooking utensil.
Figure 9:
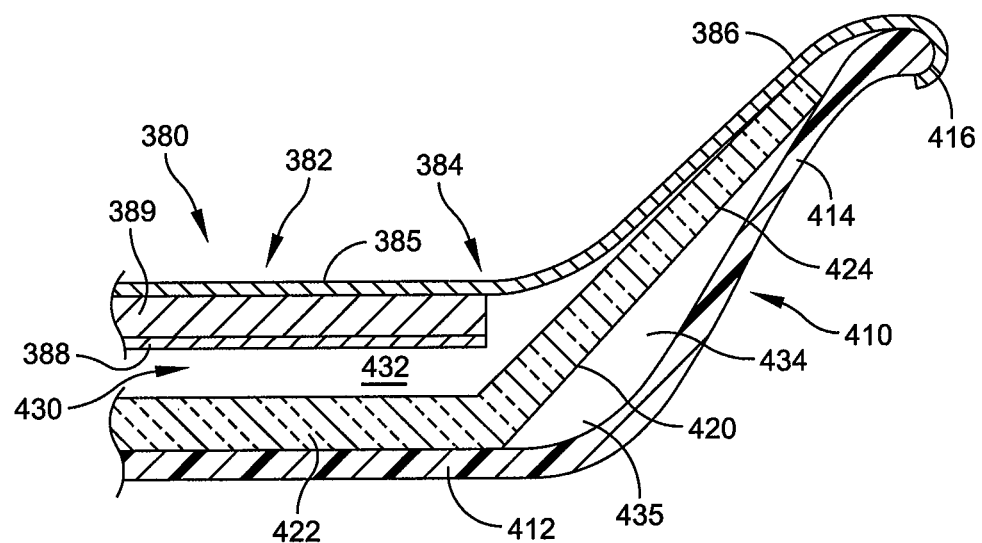
FIG. 9 is a partial, cross-sectional view of a cooking utensil.
Figure 10:
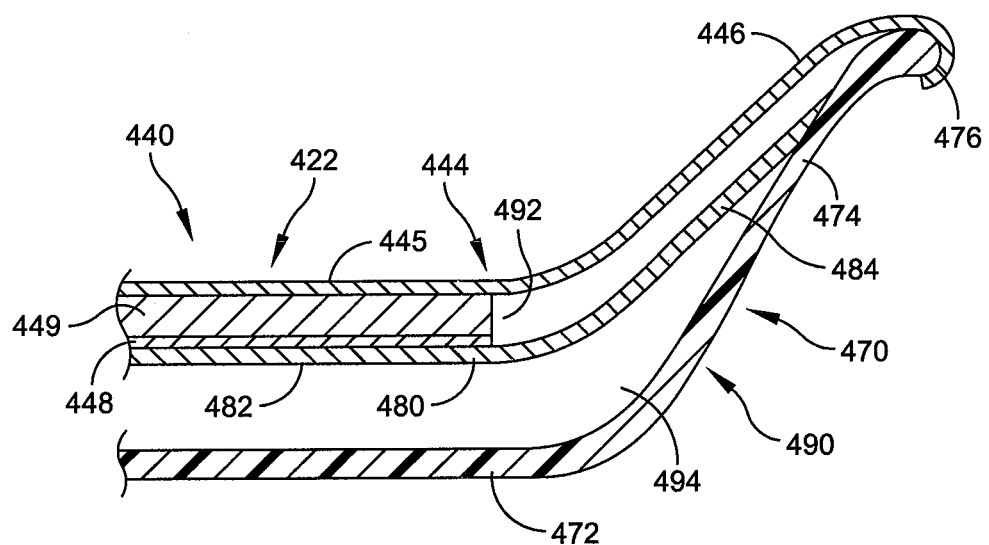
FIG. 10 is a partial, cross-sectional view of a cooking utensil.

Another embodiment, cooking utensil 80, is shown in FIG. 2. Utensil 80 includes inner wall 82 that comprises innermost wall 84 which defines a bottom portion 85 and sidewall portion 86. Sidewall portion 86 is joined to sidewall portion 94 of outer wall 90 at wall joint location 98. Target 88 is coupled to wall 84. The coupling of the target to the innermost wall can be direct as shown in FIG. 2. Alternatively, for example when a heat spreader (389, 449) is located between target 88 and wall 84 such as shown in FIGS. 9 and 10, this coupling is indirect. Insulation layer 96 lies on the inside surface of bottom portion 92 of outer wall 90. Divider 100 sits between insulation layer 96 and innermost wall 84. Intermediate wall or divider 100 creates inner chamber 112 and outer chamber 114 by dividing the gap 110 formed between inner wall 82 and outer wall 90. Divider 100 thus prevents convective heat transfer from target 88 to the portions of wall 90 not covered by insulation 96. Divider 100 has a flared, generally annular shape that defines an open upper end that is wider than the open bottom end. Divider 100 cradles dish-shaped wall 82. Divider lower end 102 can be slightly elongated to create a greater contact area with layer 96 to help push layer 96 against wall 90. Divider upper end 104 is in contact with inner wall 82; in this example upper end 104 is in contact with sidewall portion 86 of inner wall 82. Divider 100 can be a ring (e.g., of aluminum) that is placed down on layer 96 during assembly of utensil 80. Wall 82 can then be placed down onto divider 100. Joint 98 can then be formed. In this case, divider 100 is sufficiently mechanically stiff to transfer the load placed on it by wall 82 to layer 96. Because of the flared generally annular shape, divider 100 also acts as a seat and centering ring to help properly locate wall 82 relative to wall 90. Divider 100 thus also assists with the assembly and manufacturing of utensil 80.

Figure 3:
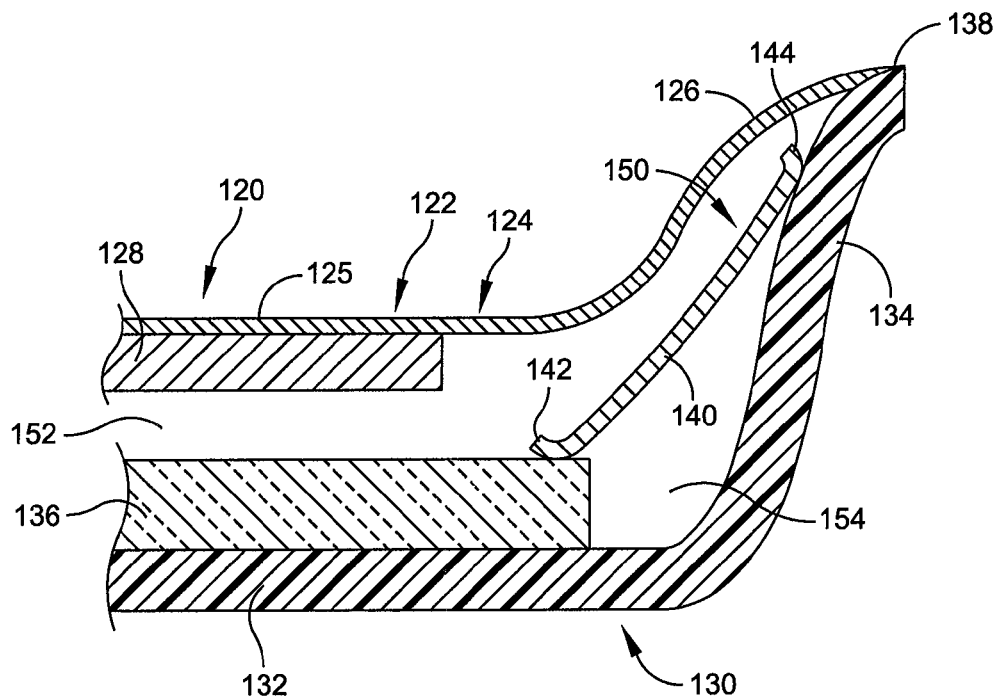
FIG. 3 is a partial, cross-sectional view of a cooking utensil.

Utensil 120, FIG. 3, comprises inner wall 122 with innermost wall 124 and target 128. Innermost wall 124 defines bottom portion 125 and sidewall portion 126. Outer wall 130 defines bottom 132 and sidewall 134. Inner wall 122 and outer wall 130 meet at joint 138. Insulation layer 136 sits on wall 130. Divider 140 is located between insulation layer 136 and outer wall 130, specifically sidewall portion 134 of wall 130. Divider 140 has lower end 142 and upper end 144 that are located in inner chamber 152 of gap 150. Outer chamber 154 is in part defined by divider/intermediate wall 140. Divider 140 illustrates that either one or both ends of the divider do not need to contact a wall or an insulation layer; rather, other portions of the divider can make the desired contact.

Figure 4:
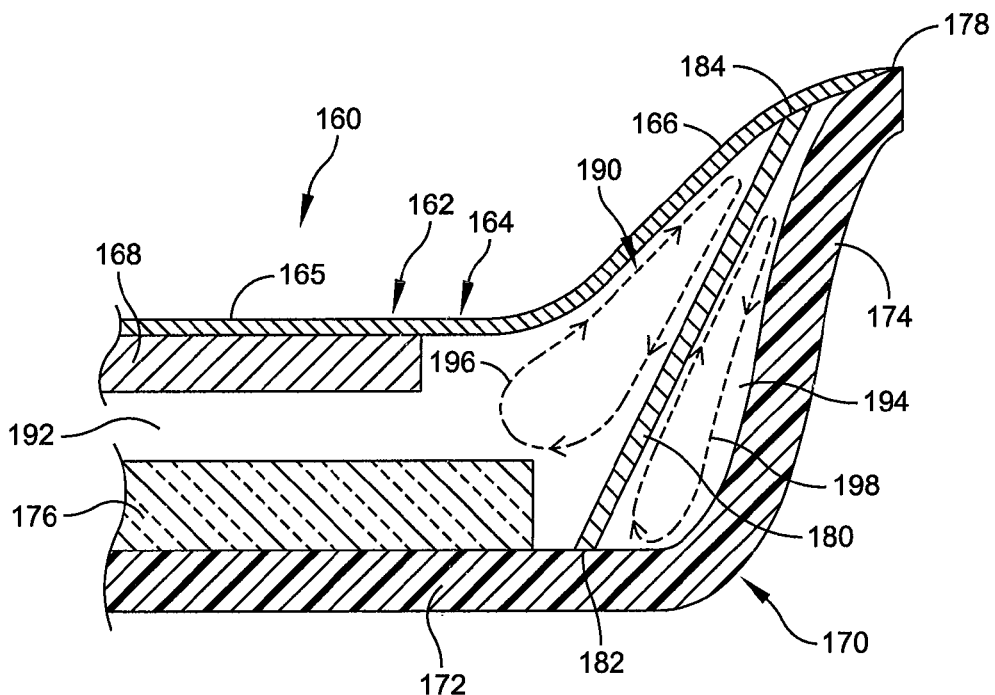
FIG. 4 is a partial, cross-sectional view of a cooking utensil.

Other aspects are illustrated in FIG. 4. Utensil 160 comprises inner wall 162 with innermost wall 164 and target 168. Wall 164 defines bottom portion 165 and sidewall portion 166. Outer wall 170 defines bottom portion 172 and sidewall portion 174. The two walls meet at joint 178. Insulation layer 176 is located on wall 170.

Divider 180 separates inter-wall gap 190 into inner chamber 192 and outer chamber 194. In this case, divider 180 is a solid straight flared annular member with one end 182 located on wall 170 and the other end 184 located on wall 162. This figure also illustrates conceptually one function of divider 180 which is to prevent convective heat transfer from all or part of wall 162 to all or part of sidewall portion 174 of outer wall 170, and potentially some of bottom portion 172 of outer wall 170; in other words, prevent convective heat transfer to the portions of wall 170 that border chamber 194. Convection is illustrated by convection loop 196 in chamber 192 and convection loop 198 in chamber 194. Any gas located in chamber 192 that is heated by target 168 and/or wall 164 will rise up towards the top of chamber 192, and as the gas cools it will drop down lower into the chamber. If divider 180 was not present, the heated air would contact wall 170. Specifically, the heated air would tend to concentrate towards the upper end of sidewall portion 174. Divider 180 prevents such contact. Divider 180 will be heated by convection and radiation and will itself heat gas within chamber 194 in a convection flow illustrated by loop 198. Also heat will radiate from divider 180 to wall 170. However, since the divider is at a lower temperature than wall 164, the heat transfer rate by convection and radiation is reduced and thus the beneficial effect of barrier 180 is achieved. Further, some heat may be conducted within divider 180, the heat emanating both from location 184 where wall 180 contacts hot wall 162, and heat from chamber 192. This conduction path ending at point 182 will provide heat flow to point 182. However, since divider 180 is or can be relatively thin the heat flow is expected to be negligible, particularly in comparison to the heat that would be transferred to outer wall 170 without the presence of divider 180. Further, divider 180 can be made of a poor heat conductor in order to minimize this effect. Non-limiting examples of divider 180 include plastic or fiberglass materials 1.5 mm or less in thickness. A non-magnetic metal such as aluminum that was about 0.5 mm or less in thickness could also be used.

Figure 5:
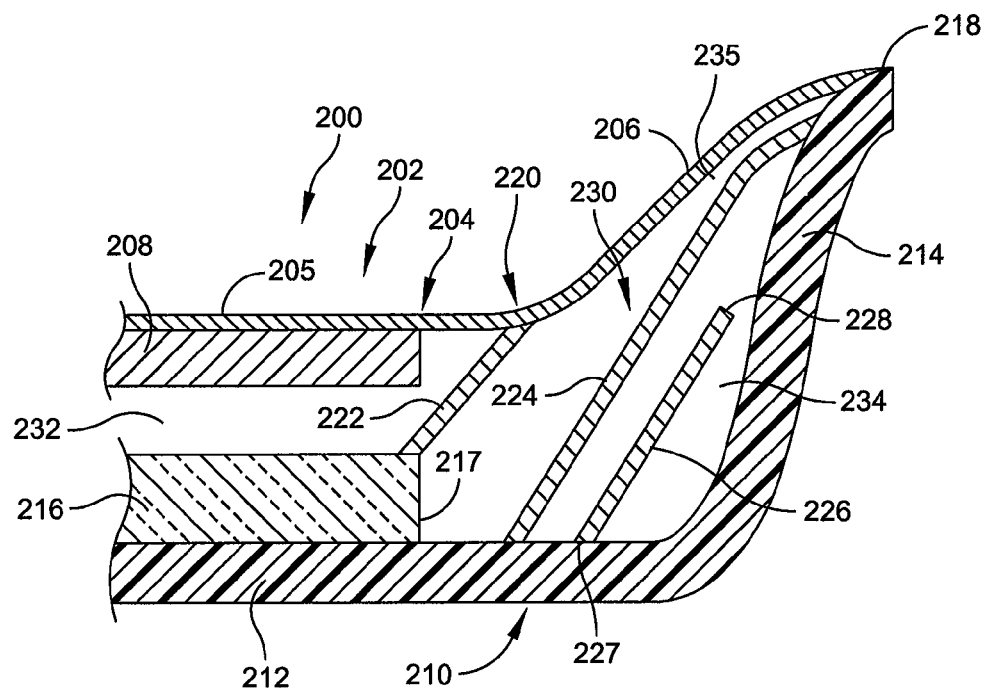
FIG. 5 is a partial, cross-sectional view of a cooking utensil.

FIG. 5 illustrates additional alternative constructions and arrangements for the intermediate wall or divider. In this case, cooking utensil 200 comprises inner wall 202 with innermost wall 204 and target 208. Wall 204 defines bottom portion 205 and sidewall portion 206 that ends at joint 218. Outer wall 210 defines bottom portion 212 and sidewall portion 214. Insulation layer 216 is located in gap 230 formed between inner wall 202 and outer wall 210.

Divider 220 comprises multiple (three in this non-limiting example) separate thin, solid, flared, generally annular members 222, 224, and 226. Member 222 is located between insulation panel 216 and inner wall 202. Member 222 creates first inner chamber 232 from gap 230. Second flared generally annular solid member 224 is coupled between portion 212 of wall 210 and the upper end of portion 214 of wall 210, and creates intermediate chamber 235. Third member 226 has a lower end 227 in contact with wall 210 and an upper end 228 located in chamber 234, and illustrates a divider with one end that is not coupled to either of the walls or the insulation layer.

In one case, the divider wall or one of the divider walls is coupled to the insulation layer and is also coupled to the innermost wall of the utensil at a location spaced from the target and between the outer wall and the target. Divider 222 is an example. A divider in this location accomplishes a physical barrier between the target and the portion of the outer wall that is not covered by insulation, to prevent convective heat transfer from the target to much or all of the un-insulated portions of outer wall 210, and greatly decrease radiative heat transfer from the target and the bottom portion 205 of inner wall 204 to outer wall 210. This figure also illustrates that a divider can contact the lower portion of the outer wall directly as opposed to it being coupled to the outer wall indirectly through the insulation layer; such direct coupling is illustrated by divider 224. If divider 224 were the sole divider in utensil 200, it would be effective in preventing hot air from rising and contacting almost all of the upper part of sidewall portion 214, but it would not be effective in preventing gas heated by target 208 from contacting any portion of wall 210 located between end 217 of insulation layer 216 and divider 224. Divider wall 226 inhibits radiative heat transfer to at least the part of wall 210 that is shielded by divider 226.

Figure 6:
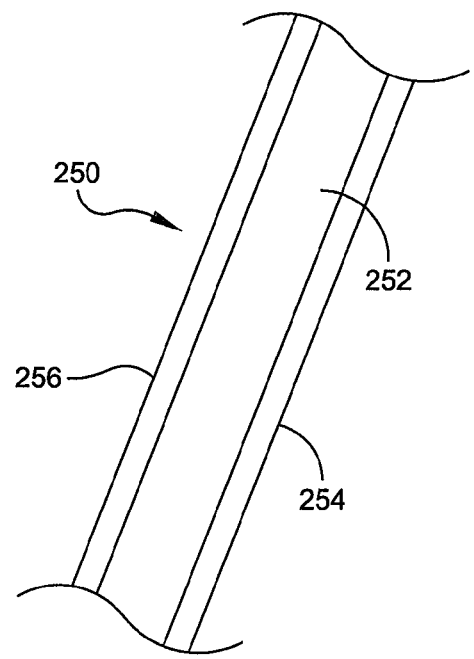
FIG. 6 is a partial, cross-sectional view of a divider for a cooking utensil.

FIG. 6 illustrates a portion of an intermediate wall or divider 250 that has been manufactured to exhibit high reflectivity and low emissivity. This can be accomplished by providing one or both of heat reflective surfaces 254 and 256 on solid generally annular member 252. Plastic films metalized on both surfaces can be used as effective heat reflectors and could be used as a divider in the utensil as long as the materials are able to withstand the heat, the materials provide any structural function for which the intermediate wall is designed, and the reflective material is not heated by induction.

Figure 7:
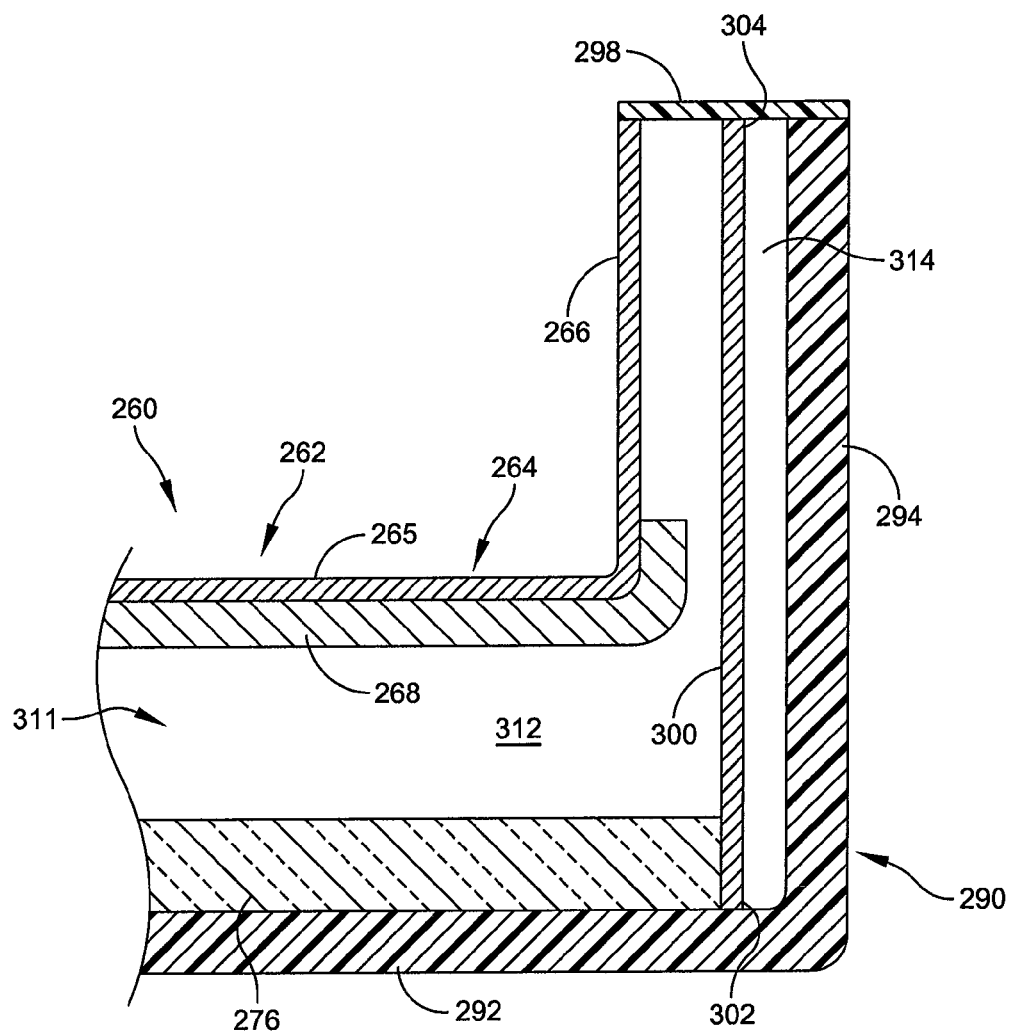
FIG. 7 is a partial, cross-sectional view of a cooking utensil.

FIG. 7 illustrates a different type of cookware 260 in which the sidewall is vertical rather than flared as shown in the other embodiments. A sauce pan is an example of cookware that commonly has this shape. Inner wall 262 comprises innermost wall 264 that defines bottom portion 265 and sidewall portion 266. Target 268 is directly coupled to wall 262. If the innermost wall and the target are made from the same material, they can be formed together in one operation. Otherwise, if the two are made from different metals (or other materials) they can be directly coupled together in an appropriate manner, for example via welding. Utensil 260 also illustrates target 268 being located in part against bottom portion 265 and in part against sidewall portion 266. Since the target is the member heated by induction, its location is selected to achieve a desired result of heat transfer from target 268 to inner wall 262. Outer wall 290 comprises bottom portion 292 and sidewall portion 294. Intermediate wall 300 is coupled, directly or indirectly, to wall 290. In this case, lower end 302 sits on portion 292 of wall 290. An alternative would be to place end 302 on insulation layer 276; layer 276 could extend out to vertical sidewall portion 294. Upper end 304 of wall 300 is coupled to joint 298. Joint 298 in this case comprises an annular heat insulative member that is directly joined to the top ends of walls 262 and 290. Intermediate wall 300 divides gap 311 between walls 262 and 290 into interior chamber 312 and exterior chamber 314, and thus is effective at preventing convective heat transfer and direct radiative heat transfer from wall 262 to the un-insulated parts of wall 290.

Figure 8:
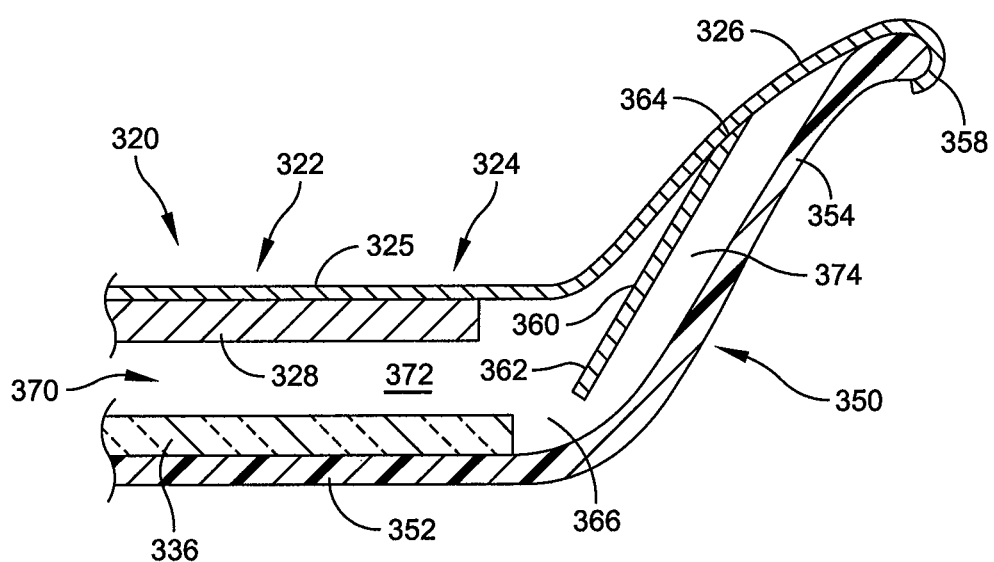
FIG. 8 is a partial, cross-sectional view of a cooking utensil.

FIG. 8 illustrates additional alternative constructions and arrangements for cooking utensil 320 which comprises inner wall 322 with innermost wall 324 and target 328. Wall 324 defines bottom portion 325 and sidewall portion 326 that ends at joint 358 which in this non-limiting example is formed by cold rolling innermost wall 324 over the top of outer wall 350. Outer wall 350 defines bottom portion 352 and sidewall portion 354. Insulation layer 336 is located in gap 370 formed between inner wall 322 and outer wall 350.

Divider 360 is a thin, solid, flared, generally annular member that is coupled at upper end 364 to sidewall portion 326 and defines lower end 362 located in the lower portion of gap 370. Divider 360 defines one sidewall of both inner chamber 372 and outer chamber 374. These chambers are interconnected by space 366 and are thus partially open at the bottom. However, since gas in gap 370 that is heated by target 328 and wall 324 will naturally rise and there is no gap between upper end 364 of divider 360 and wall 324, divider 360 prevents the heated gas from reaching outer wall 350; the lower opening between chambers 372 and 374 thus likely has little effect on the efficacy of the inhibition of convective heat transfer to wall 350. Further, divider 360 shields most or all of wall 350 that is not covered by insulation 336 from direct radiative heat transfer from inner wall 322.

FIG. 9 illustrates additional alternative constructions and arrangements for cooking utensil 380 which comprises inner wall 382 with innermost wall 384, target 388 and heat spreader 389. Heat spreader 389 helps to distribute heat from target 388 to wall 384 more evenly, to reduce hot and cold spots. Heat spreader 389 is typically made from a highly heat conductive material such as aluminum or an aluminum alloy, or a laminated composite of aluminum or an aluminum alloy. Wall 384 defines bottom portion 385 and sidewall portion 386 that ends at joint 416 which in this non-limiting example is formed by cold rolling innermost wall 384 over the top of outer wall 410. Outer wall 410 defines bottom portion 412 and sidewall portion 414.

Insulation layer 420 is located in gap 430 formed between inner wall 382 and outer wall 410. Insulation layer 420 includes lower portion 422 that insulates bottom portion 412 of outer wall 410. Insulation layer 420 further includes upwardly extending portion 424 that functions as a divider that divides gap 430 into inner chamber 432 and outer chamber 434. The upper end of portion 424 may contact outer wall sidewall portion 414 and/or inner wall sidewall portion 386. This arrangement accomplishes a divider without the need for a structure that is separate from the insulation layer. Also, since the structure that acts as the divider is itself insulating, it is effective to reduce convective, radiative and conductive heat transfer from wall 382 to wall 410. Although insulation 420 may be somewhat porous and thus not be entirely sealed to airflow through its thickness, it accomplishes a significant barrier and resistance sufficient to prevent bulk airflow and thus substantially reduce convective heat transfer to wall 410.

Barrier or divider 424, as with the other barriers or dividers disclosed herein, is at least in part spaced from both inner wall sidewall portion 386 and outer wall sidewall portion 414. The inner and outer chambers formed by such spacing provide functional advantages. For one the spaces can be used for other devices or components, for example a temperature sensor located in inner chamber 432 and coupled to target 388 or heat spreader 389, and/or a circuit board (e.g., to accomplish wireless communications with a receiver or transceiver located outside of the cookware such as in the adjacent cooktop) located in chamber 434. Because of convection, the coolest part of chamber 434 is in the lowermost corner 435. Accordingly, any circuitry carried in chamber 434 is best placed in this location. Another advantage of barrier or divider 424, as with the other barriers or dividers disclosed herein, is that it interferes with the convection cycle that would otherwise exist between inner wall 382 and outer wall 410, and creates two smaller convection cycles, one in each chamber. This reduces convective heat transfer to outer wall 41Q and thus maintains outer wall 410 at a lower temperature than it otherwise would be.

A similar embodiment is depicted in FIG. 10. Cooking utensil 440 comprises inner wall 442 with innermost wall 444, target 448 and heat spreader 449. Heat spreader 449 helps to distribute heat from target 448 to wall 444 more evenly, to reduce hot and cold spots. Wall 444 defines bottom portion 445 and sidewall portion 446 that ends at joint 476 which in this non-limiting example is formed by cold rolling innermost wall 444 over the top of outer wall 470. Outer wall 470 defines bottom portion 472 and sidewall portion 474.

Insulation layer 480 is located in gap 490 formed between inner wall 442 and outer wall 470. Insulation layer 480 includes lower portion 482 that lies against target 448 and so inhibits radiative heat transfer from target 448 to outer wall 470. Insulation layer 480 further includes upwardly extending portion 484 that functions as a divider that divides gap 490 into inner chamber 492 and outer chamber 494. The upper end of portion 484 may contact outer wall sidewall portion 474 and/or inner wall sidewall portion 446; in this non-limiting example it contacts only outer wall sidewall portion 474. This arrangement accomplishes a divider without the need for a structure that is separate from the insulation layer. Also, since the structure that acts as the divider is itself insulating, it is effective to reduce convective, radiative and conductive heat transfer from wall 442 to wall 470. Although insulation 480 may not be entirely sealed to airflow through its thickness, it accomplishes a significant barrier and resistance sufficient to prevent bulk airflow and thus substantially reduce convective heat transfer.

Barrier or divider 484, as with the other barriers or dividers disclosed herein, is at least in part spaced from both inner wall sidewall portion 446 and outer wall sidewall portion 474. The inner and outer chambers formed by such spacing provide functional advantages. For one the spaces can be used for other devices or components, for example a temperature sensor located in inner chamber 492 and coupled to target 448 or heat spreader 449, and/or a circuit board (e.g., to accomplish wireless communications with a receiver or transceiver located outside of the cookware such as in the adjacent cooktop) located in chamber 494. Because of convection, the coolest part of chamber 494 is in the lowermost corner. Accordingly, any circuitry carried in chamber 494 is best placed in this location. Another advantage of barrier or divider 484, as with the other barriers or dividers disclosed herein, is that it interferes with the convection cycle that would otherwise exist between inner wall 442 and outer wall 470, and creates two smaller convection cycles, one in each chamber. This reduces convective heat transfer to outer wall 470 and thus maintains outer wall 470 at a lower temperature than it otherwise would be.

A number of embodiments have been shown and described. Nevertheless, it will be understood that various modifications may be made without departing from the spirit and scope of the invention. For example, some features may be shown in one or more but not all of the drawings. Accordingly, other embodiments are within the scope of the claims.

What is claimed is:

1. A cooking utensil that is adapted for use with an induction cooktop having a cooktop surface and an induction heating coil, the cooking utensil comprising:
    an inner wall comprising an innermost wall and a ferromagnetic target that is in thermal contact with the innermost wall, where the target is adapted to be heated by induction;
    an outer wall comprising an electrically non-conductive material;
    wherein the inner and outer walls are spaced from one another except at a joint location where they are coupled together, to thereby define a gap between the inner and outer walls;
    wherein the inner wall defines a bottom portion located closest to the cooktop surface during operation of the induction heating coil and a sidewall portion located farther from the cooktop surface during operation of the induction heating coil, wherein the outer wall defines a bottom portion located on the cooktop surface during operation of the induction heating coil and a sidewall portion spaced above the cooktop surface during operation of the induction heating coil; and
    a thin, solid, generally annular intermediate wall in the gap and not in direct contact with the target, the intermediate wall dividing the gap into an inner closed chamber between the inner wall and the intermediate wall and an outer closed chamber between the outer wall and the intermediate wall, wherein the outer chamber extends along the outer wall for at least most of the length of the sidewall portion of the outer wall, and wherein the intermediate wall prevents the flow of heated gas from the inner chamber into the outer chamber and has a relatively low thermal conductivity to inhibit heat transfer along the length of the intermediate wall.

2. The cooking utensil of claim 1 further comprising a layer of thermally insulating material positioned between the inner wall and the outer wall.

3. The cooking utensil of claim 2 wherein the layer of thermally insulating material has an area that substantially covers at least the bottom portion of the outer wall.

4. The cooking utensil of claim 2 wherein the intermediate wall is in contact with the layer of thermally insulating material and one or both of the inner wall and the outer wall.

5. The cooking utensil of claim 4 wherein the intermediate wall contacts the outer wall proximate the joint location.

6. The cooking utensil of claim 5 wherein the joint location is proximate both the inner wall and the outer wall sidewall portions that are farthest from the cooktop surface when the bottom portion of the outer wall is located on the cooktop surface.

7. The cooking utensil of claim 4 wherein the layer of thermally insulating material defines an outer edge closest to the sidewall portion of the outer wall, and wherein the intermediate wall is in contact with the layer of thermally insulating material proximate its outer edge.

8. The cooking utensil of claim 4 wherein the intermediate wall does not contact the inner wall.

9. The cooking utensil of claim 2 wherein the intermediate wall has two ends, a first end in contact with the layer of thermally insulating material and a second end in contact with the inner wall.

10. The cooking utensil of claim 9 wherein the second end of the intermediate wall contacts the sidewall portion of the inner wall, without contacting the outer wall.

11. The cooking utensil of claim 9 wherein the layer of thermally insulating material defines an outer edge closest to the sidewall portion of the outer wall, and wherein the first end of the intermediate wall is in contact with the layer of thermally insulating material proximate its outer edge.

12. The cooking utensil of claim 9 wherein the intermediate wall does not contact the outer wall.

13. The cooking utensil of claim 2 wherein:
    the target is directly above the layer of thermally insulating material;
    the layer of thermally insulating material defines an outer edge closest to the sidewall portion of the outer wall;
    the intermediate wall is in contact with the layer of thermally insulating material proximate its outer edge; and
    the intermediate wall is in contact with one of the inner and outer walls.

14. The cooking utensil of claim 1 wherein the intermediate wall comprises a flared generally annular member.

15. The cooking utensil of claim 1 wherein the intermediate wall is flared such that it is wider at one end than the other end.

16. The cooking utensil of claim 1 wherein the layer of thermally insulating material defines an outer edge closest to the sidewall portion of the outer wall, and wherein the generally annular member contacts the layer of thermally insulating material proximate its outer edge.

17. The cooking utensil of claim 1 wherein the intermediate wall is relatively rigid.

18. The cooking utensil of claim 1 wherein the intermediate wall is flexible.

19. The cooking utensil of claim 1 wherein the intermediate wall is reflective of infrared radiation.

20. The cooking utensil of claim 1 wherein the intermediate wall has a low emissivity.

21. The cooking utensil of claim 1 wherein the intermediate wall is comprised of thermally insulating material.

22. The cooking utensil of claim 21 wherein the layer of thermally insulating material is against the bottom portion of the outer wall and contacts the sidewall portion of one or both of the inner wall and outer wall.

23. The cooking utensil of claim 21 wherein the thermally insulating material is against the target and contacts the sidewall portion of one or both of the inner wall and outer wall.

24. A cooking utensil that is adapted for use with an induction cooktop having a cooktop surface and an induction heating coil, the cooking utensil comprising:
an outer wall that is the outermost wall of the cooking utensil, the outer wall comprising an electrically non-conductive material, a bottom portion located on the cooktop surface during operation of the induction heating coil, and a sidewall portion spaced above the cooktop surface when the bottom portion of the outer wall is located on the cooktop surface;
a layer of thermally insulating material on the inside of the outer wall, wherein the layer of thermally insulating material has an area that substantially covers the bottom portion of the outer wall and defines an outer edge closest to the sidewall portion of the outer wall;
an inner wall comprising the innermost wall of the cooking utensil and a ferromagnetic target that is adapted to be heated by induction, wherein the target is directly above and spaced from the layer of thermally insulating material, the innermost wall defining a bottom portion located closest to the cooktop surface during operation of the induction heating coil and a sidewall portion located farther from the cooktop surface during operation of the induction heating coil;
wherein the innermost and outer walls are spaced from one another by a gap, except at a joint location where they are coupled together, wherein the joint location is proximate both the innermost wall sidewall portion farthest from the cooktop surface when the bottom portion of the outer wall is located on the cooktop surface and the outer wall sidewall portion farthest from the cooktop surface when the bottom portion of the outer wall is located on the cooktop surface; and
a thin, solid generally annular partition, the partition positioned in the gap between the innermost wall and the outer wall, wherein the partition is in contact with the layer of thermally insulating material proximate its outer edge and the partition is in contact with one or both of the outer wall and the inner wall proximate the joint location, the partition not in direct contact with the target, the partition dividing the gap into an inner closed chamber between the inner wall and the partition and an outer closed chamber between the outer wall and the partition, wherein the outer chamber extends along the outer wall for at least most of the length of the sidewall portion of the outer wall, and wherein the partition prevents the flow of heated gas from the inner chamber into the outer chamber and has a relatively low thermal conductivity to inhibit heat transfer along the length of the partition.

25. The cooking utensil of claim 24 wherein the partition contacts both the outer wall and the inner wall.

26. The cooking utensil of claim 24 wherein the partition does not contact the inner wall.

27. A method for manufacturing a cooking utensil, comprising:
providing an inner wall that includes at least some electrically conductive material that is configured to be a target for an induction heating coil;
providing an outer wall formed of an electrically non-conductive material;
providing a layer of insulation;
providing a thin, solid, generally annular intermediate wall;
locating the layer of insulation on the outer wall;
locating the intermediate wall on the layer of insulation; and
coupling the inner and outer walls at a joint location such that the layer of insulation and the intermediate wall are located between the inner wall and outer wall, with the intermediate wall in contact with the layer of insulation and in contact with at least one of the inner wall and the outer wall;
wherein the inner and outer walls are spaced from one another except at the joint location, to thereby define a gap between the inner and outer walls;
wherein the inner wall defines a bottom portion located closest to the cooktop surface during operation of the induction heating coil and a sidewall portion located farther from the cooktop surface during operation of the induction heating coil, wherein the outer wall defines a bottom portion located on the cooktop surface during operation of the induction heating coil and a sidewall portion spaced above the cooktop surface during operation of the induction heating coil; and
wherein the intermediate wall is located in the gap and not in direct contact with the target, the intermediate wall dividing the gap into an inner closed chamber between the inner wall and the intermediate wall and an outer closed chamber between the outer wall and the intermediate wall, wherein the outer chamber extends along the outer wall for at least most of the length of the sidewall portion of the outer wall, and wherein the intermediate wall prevents the flow of heated gas from the inner chamber into the outer chamber and has a relatively low thermal conductivity to inhibit heat transfer along the length of the intermediate wall.

28. The method of claim 27 wherein the intermediate wall is constructed and arranged such that it has two ends, and the intermediate wall contacts the layer of insulation at or proximate a first end of the intermediate wall and contacts one of the inner wall and the outer wall at or proximate a second end of the intermediate wall.

29. The method of claim 28 wherein the intermediate wall is further constructed and arranged such that no other part of the intermediate wall contacts either the inner wall or the outer wall.

* * * * *